United States Patent Office

2,910,372
Patented Oct. 27, 1959

2,910,372

IRRADIATED CONCRETE COMPOSITIONS

Simon L. Ruskin, New York, N.Y., assignor to Union Carbide Corporation, New York, N.Y., a corporation of New York No Drawing. Application August 5, 1955
Serial No. 526,766

14 Claims. (Cl. 106—89)

My invention relates to the preparation of cement alloys wherein the elements of cement such as Portland cement are processed so as to create a eutectic compound with various metal components, more particularly the oxides or sulphides or salts of the hard metals which are known for their heat and corrosion resistance such as titanium, molybdenum, tantalum, tungsten and, to a lesser degree, nickel, zirconium, cobalt, chromium, silver, cadmium, copper, lead, manganese iron, antimony, bismuth, aluminum. This composition may also be combined with an organic binder compound.

As a further object of my invention is the improvement of cements so as to diminish shrinkage and creep and to improve hardening, heat resistance and strength of concrete.

To practice my invention I cause the elements of cement to form larger chemical complexes by cross linkages through hydrogen binding. I diminish the tendency toward the formation of $Ca(OH)_2$ which is a weakening agent rendering the cement subject to the effect of atmospheric $CO_2$ and increase stability of the fine $C_3S$ formation by inducing higher entropy of the fine $C_3S$ crystals. To accomplish these objectives I irradiate the Portland cement with 100 million to 400 million roentgens. While this is most readily accomplished in the dry state, I may also conduct this reaction in an anhydrous paste such as is made with equal parts of glycerine. When the dry state irradiation is employed, hydration of the cement proceeds more rapidly than normal and can be retarded by the usual retarders such as gypsum. The setting occurs at room temperature or at temperatures up to 100° C. and in some instances up to 180° C. or under steam curing. When, however, the anhydrous paste is employed, cement blocks of high strength can be produced by heating to 600° C. whereby a plastic type of cement is produced combining great smoothness and strength. The hydration of the cement occurs in a polymerized calcium oxide silicate complex on the carbon skeleton of the glycerine.

A still further object of the invention is the irradiation with 100 million roentgens of Portland cement with the oxides or salts of metallic elements, particularly of the hard metals such as titanium, tantalum, molybdenum, or tungsten, with or without a binder metal such as powdered nickel, cobalt, lead, zirconium, chromium, copper, iron, aluminum or other metal of low enough melting point and sintering this composition at 600° C. to produce a refractory composition.

I have found that by irradiating the oxides or salts of metals with 100 million roentgens to 400 million roentgens, it is possible to wet the metal oxide with molten metals of low melting point so that a union between the metal atom of the oxide and the molten binder metal occurs. This union establishes a metal framework throughout the cement creating a remarkable reinforcement lending great strength to concrete or cement blocks. In the past, the reinforcement of cement was conducted by imbedding steel rods in the concrete. These rods did not participate in the strength of the concrete per se but were rather supplementary. By my composition I provide an intimate relationship between the crystalline elements of the cement and the atomic structure of the metal. To effect this composition I add to Portland cement, 25% by weight of titanium oxide and 4% by weight of nickel powder. The whole is irradiated with 100 million roentgens to 400 million roentgens either by exposure to a source of gamma rays from a cobalt bomb or by a high voltage X-ray machine capable of delivering this range of gamma particles. While the incorporation of my hard metal oxide or hard metal particles and metal binder will in itself increase the hardness and corrosion resistance of concrete to a striking degree, I have found that the high dosage irradiation has a much greater effect. While the irradiation of the Portland cement improves the properties of the cement in hardness, the combination with the irradiated titanium oxide and binder has a valuable effect in diminishing creep and shrinkage. This reduction in creep and shrinkage is due to the metallic skeleton that forms throughout the concrete which in itself is heat resistant, corrosion resistant, and its index of expansion is such that changes of temperature will not cause fracture of the cements from expansion or contraction. A still further advantage of my titanium oxide cement composition is diminution of weight of my cement so that for flooring in construction or building construction great savings of weight are effected simultaneously with increased strength, diminished shrinkage, diminished creep and fire resistant. It also makes unnecessary steel rod reinforcements.

While I can produce my metallo-cement composition with titanium, molybdenum, tungsten, tantalum, aluminum or iron metal powder and a binder such as copper, cobalt, nickel or chromium, or a mixture of binders with natural or synthetic cements, I have found that the preferred preparation is the use of the irradiated compositions. Where the non-irradiated composition is employed, the internal stress of the cement during the process of setting and shrinking is great enough to compress intimately the metallic elements increasing the hardness of the cements. If now the whole is sintered to 600° C. to 1000° C., the cement attains metallic properties. Sintering may be carried out in various ways depending upon the size of the concrete block. Thus it can be accomplished in various types of furnaces or electrically by shortwave or induced heat.

However, the irradiation of the cement produces cross linkages as a result of the dissociation of the two water molecules bound to the calcium atoms. The hydrolyzed ions tend to bind with the silicon and three oxygen ions giving rise to the monoacidic silicate ion $(SiO_3(OH))^3$. The free hydroxyl ions would also tend to form the dicalcium silicate or hydrate while the hydrogen would be available for the reduction of the metal oxides such as titanium oxide. The formula of the dicalcium silicate or hydrate would be—$Ca_2(OH)(SiO_3(OH))$. There would thus also be less tendency for $Ca(OH)_2$ to form and also less calcite from atmospheric $CO_2$.

A still further effect of my irradiation with 100 million roentgens to 400 million roentgens is the increase in entropy. The calcium silicate hydrate 1 and 11 are fine needle-like crystals that tend to fibrous formation. It is on this property that the strength of cement apparently rests. The matting of these fibrous elements gives it holding properties. By increasing the randomness of the distribution of these crystals greater strength is attained. My irradiation with 100 million roentgens to 400 million roentgens produces increased randomness and thus increased strength of the hydrated calcium silicates. Additional added elements of metallic nature would also attain higher entropy.

Compounds in the system CaO—SiO$_2$—H$_2$O tend to group themselves crystallographically with a fibrous group and a non-fibrous group. I have found that by my irradiation to 100 million roentgens to 400 million roentgens the fibrous group predominates leading to an increase in strength of the final cement. My irradiation also tends to induce a metastable state so that lower temperatures are necessary to produce chemical interaction and formation not only of the fibrous structures but also of the lamellar and prismatic plates, thus leading to quicker ultimate hardening. This effect is doubtless due to the interlocking of crystals and to the variety of compounds formed as a result of my high irradiation.

The dosage of my irradiation may vary with the composition of the materials employed, while 100 million roentgens to 400 million roentgens gives the greatest degree of change, lower dosages such as 1 million to 100 million may be used for specific effects. Empirical dosages would depend on the source of the cement. As my radiation source, I may use any arrangement producing gamma radiation.

A still further effect of my irradiation is to increase the lattice energy of the tricalcium silicate and probably also increase the presence of holes in the structure, thus giving the compound not only a high solubility and reactivity toward water, but allowing the movement of metallic atoms. Semi-conduction properties may thus also be imparted to my metallo cement compositions. Thus the alite of Portland cement clinker is not pure tricalcium silicate but contains a small amount of MgO and Al$_2$O$_3$. This cell contains nine molecules of C$_3$S. Thus it has been estimated to contain 36 molecules of C$_3$S in which four silicon atoms have been replaced by aluminum and two magnesium ions have come into nearby holes in the lattice to balance the charges. Substitution of the magnesium and aluminum with titanium and nickel markedly alters the properties of the cement. By my irradiation I may thus induce a heterogeneous equilibrium.

While I have described my process for the treatment of cement, my invention is also applicable to lime, gypsum plaster, clay or shale and furnace slags, depending on the variety of compositions that I desire to prepare. Thus I may also use my procedure in the preparation of refractories, enamels, vitrified or porcelain ceramics, building bricks, fire bricks. Instead of cements, I may use pure clays, frits or various kinds of mixtures of frits with clay and metal oxides.

Various degrees of moisture may be used to modify the plasticity and mouldability of my compositions and various amounts of electrolytes may be added.

I may embody my irradiated titanium oxide and powdered metal binder during the manufacture of the Portland cement or I may prepare the Portland cement first and add my irradiated titanium and powdered metal binder to the finished cement. Thus I may sinter all of the raw materials at one time or I may sinter first the Portland cement and then sinter the cement titanium oxide binder brick or block. Where iron blast furnace slag is used, the irradiated metal oxide and binder is subsequently added. In natural cements the irradiated metal oxide and binder may be subsequently added or, as in the prepared cement, the whole product, cement, metal oxide and binder are simultaneously irradiated.

As a result of my invention it is possible to bring about reactions between organic and inorganic substances. By my irradiation of 100 million roentgens to 400 million roentgens, I bring about lattice imperfections in inorganic substances which promotes the formation of transition states favoring the development of solid solutions. Thus non-metallic rocks, minerals and industrial refuses can be brought to react with organic compounds to produce cements and ceramics of unique properties of strength, corrosion resistance and heat resistance. Among the organic compounds most useful for this purpose are the group of carbohydrates, glycols and cellulose and their derivatives, particularly the amine derivatives. Thus chitin containing carbonate shells when ground to fine powder and mixed with Portland cement and titanium oxide when irradiated to 100 million roentgens to 400 million roentgens sets to form a fine white ceramet. When sintered to 2000° F. an excellent refractory brick is formed.

*Example I*

To 770 lbs. of limestone add 230 lbs. of shale. The material is dried in a rotary furnace and crushed in a hammer mill till pulverized to 100 mesh. 250 lbs. of titanium oxide are now added and the whole is irradiated with 100 million roentgens. The whole is sintered to from 1800° F. to 2900° F., giving a fine friable clinker that is crushed to 200 mesh. 300 lbs. of gypsum are now added as retarder.

To a sack of this cement is added 4 gallons of water and the whole permitted to set. After 7 days the tensile strength is between 1500 lbs. to 1000 lbs. per square inch.

*Example II*

To 7 sacks of cement prepared as in 1, is added .51 cubic yard of sand and .77 cubic yard of stone. The whole is stirred up with 4 gallons of water and permitted to set. A compact block of concrete is formed that is creep resistant and heat resistant.

*Example III*

200 grams of Portland cement was mixed with 20 grams of titanium oxide and 10 grams of nickel powder. The whole was irradiated with 100 million roentgens. To the irradiated mixture was now added 10 cc. of water and the mixture allowed to set. The excess water was drained off and the mass was heated to 180° C. The resultant cement block showed increased tensile strength in excess of 1500 lbs. per square inch. It was also creep resistant and heat resistant.

*Example IV*

The procedure of Example II was followed producing a gray cement block. This was now sintered to 600° C. The block darkened in color and contracted moderately. The sintered block showed heat resistance up to 3000° F., no further contraction and tensile strength in excess of 2000 lbs. per square inch.

*Example V*

200 grams of Portland cement irradiated with 100 million roentgens was mixed with 20 grams of a paste of titanium oxide and glycerine which had been irradiated with 100 million roentgens and 5 grams of copper powder. The whole was stirred up with 10 cc. of water and allowed to set. The excess water was decanted and the paste allowed to set in a form. The mass was heated to 180° C. and formed a solid cement brick.

*Example VI*

The procedure of Example IV was carried out and the brick was sintered at 600° C. The brick darkened and had high refractory properties.

*Example VII*

Procedure was followed as in Example I. The resultant concrete block was sintered electrically at a temperature of 600° C. The resultant concrete block showed no further contraction, creep resistance and temperature resistance. By the same procedure continuous stretches of concrete could be sintered to form a concrete structure.

*Example VIII*

770 grams of limestone and 230 grams of shale are mixed with 100 grams of ground lobster shells. The material is dried on a rotary furnace and crushed in a hammer mill till pulverized to 100 mesh. The whole was irradiated with 100 million roentgens. To this was now added 200 grams of a paste of titanium oxide mixed with equal parts by weight of glycerine and 10% nickel powder, the whole of which had been irradiated with 100 million roentgens. The mixture was thoroughly stirred and 60 cc. of water added. The concrete settled in the form. The concrete was heated to 180° at which temperature it set and solidified. The concrete was now given a secondary heating electrically to 600° C. The resultant concrete was resistant to further contraction, showed no creep and was resistant to high temperatures. It could be used for stoneware, laboratory tabletops, acid or alkali resistant pipes and conduits, water or sewage pipes.

*Example IX*

To 200 grams of Portland cement was added 10 grams of titanium oxide, 5 grams of chromium oxide and 5 grams of nickel powder. The whole was stirred up in 50 cc. anhydrous glycerine. The paste was irradiated with 100 million roentgens from a high voltage apparatus capable of delivering two million m.e.v. The paste was exposed in a thin layer of 25 mm. thickness on a cast iron plate. After irradiation the whole was heated to 600° C. when the surface hardened with a smooth sheen. The resultant surface layer was hard, heat resistant and corrosion resistant.

What I claim is:

1. A process for treating a Portland-type cement capable of producing a concrete of improved hardness which comprises gamma irradiating a substantial quantity of said Portland-type cement before setting with from about one million to about four hundred million roentgens.

2. A process in accordance with claim 1 wherein the gamma irradiation is from one hundred million roentgens to four hundred million roentgens.

3. A process in accordance with claim 1 wherein the Portland-type cement is combined with a glycol binder.

4. A process in accordance with claim 1 wherein a substantial quantity of at least one metal compound selected from the group consisting of oxides and sulfides of titanium, molybdenum, tantalum, tungsten, nickel, zirconium, cobalt, chromium, silver, cadmium, copper, lead, manganese, iron, antimony, bismuth and aluminum is substantially homogeneously mixed with said Portland-type cement.

5. A process in accordance with claim 4 wherein the gamma irradiation is from one hundred million roentgens to four hundred million roentgens.

6. A process in accordance with claim 4 wherein the Portland-type cement is combined with a glycol binder.

7. A process for preparing a concrete characterized by improved hardness, creep resistance and shrinkage resistance which comprises mixing with a Portland-type cement a substantial quantity of a metal oxide selected from the group consisting of oxides of titanium, tantalum, molybdenum, and tungsten and a substantial portion of at least one powdered metal selected from the group consisting of nickel, cobalt, lead, zirconium, chromium, copper, iron and aluminum, a substantial quantity of said Portland-type cement being gamma irradiated before setting with from one million to about four million roentgens, hydrating the Portland-type cement-containing mixture to effect the formation of concrete and subjecting said concrete to sintering at a temperature of about 600° C. to about 1000 C.

8. A process in accordance with claim 7 wherein the gamma irradiation is from one hundred million roentgens to four hundred million roentgens.

9. A process in accordance with claim 7 wherein the Portland-type cement is combined with a glycol binder.

10. A Portland-type cement which has been gamma irradiated with from about one hundred million roentgens to four hundred million roentgens before setting.

11. A Portland-type cement in accordance with claim 10 wherein a substantial quantity of at least one metal compound selected from the group consisting of oxides and sulfides of titanium, molybdenum, tantalum, tungsten, nickel, zirconium, cobalt, chromium, silver, cadmium, copper, lead, manganese, iron, antimony, bismuth and aluminum is substantially homogeneously mixed with said Portland-type cement.

12. A concrete containing a substantial quantity of hydrated gamma irradiated Portland-type cement, said concrete being characterized by increased hardness and said cement being irradiated before setting.

13. A concrete in accordance with claim 12 containing a substantial quantity of at least one metal compound selected from the group consisting of oxides and sulfides of titanium, molybdenum, tantalum, tungsten, nickel, zirconium, cobalt, chromium, silver, cadmium, copper, lead, manganese, iron, antimony, bismuth and aluminum.

14. A sintered concrete containing a substantial quantity of hydrated gamma irradiated Portland-type cement, said cement being irradiated before setting, said concrete being characterized by increased hardness, and containing a substantial quantity of at least one metal oxide selected from the group consisting of oxides of titanium, tantalum, molybdenum and tungsten and at least one metal selected from the group consisting of nickel, cobalt, lead, zirconium, chromium, copper, iron and aluminum.

References Cited in the file of this patent

UNITED STATES PATENTS

| 157,511 | Hall | Dec. 8, 1874 |
| 1,278,010 | Poetschke | Sept. 3, 1918 |
| 1,576,730 | Harth | Mar. 16, 1926 |
| 2,726,339 | Borst | Dec. 6, 1955 |

FOREIGN PATENTS

| 546,933 | Great Britain | Aug. 6, 1942 |
| 569,346 | Great Britain | May 18, 1945 |

OTHER REFERENCES

Article by George L. Clark and Lucy W. Pickett, pp. 466–478 inclusive, of American Chem. Society, vol. 52, 1930.